United States Patent
Nishikawa

(10) Patent No.: US 11,722,623 B2
(45) Date of Patent: Aug. 8, 2023

(54) MANAGEMENT APPARATUS, METHOD, AND NON-TRANSITORY COMPUTER READABLE STORAGE MEDIUM

(71) Applicant: CANON KABUSHIKI KAISHA, Tokyo (JP)

(72) Inventor: Satoshi Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/331,308

(22) Filed: May 26, 2021

(65) Prior Publication Data

US 2021/0377417 A1     Dec. 2, 2021

(30) Foreign Application Priority Data

May 29, 2020   (JP) ................. 2020-094913

(51) Int. Cl.
*G06F 15/00*   (2006.01)
*H04N 1/32*    (2006.01)
*G06F 3/12*    (2006.01)

(52) U.S. Cl.
CPC ....... *H04N 1/32122* (2013.01); *G06F 3/1203* (2013.01); *G06F 3/1232* (2013.01); *H04N 2201/3202* (2013.01)

(58) Field of Classification Search
CPC ........ H04N 1/32122; H04N 2201/3202; G06F 3/1203; G06F 3/1232
USPC ....................................... 358/1.15
See application file for complete search history.

(56) References Cited

U.S. PATENT DOCUMENTS

| | | | | |
|---|---|---|---|---|
| 2011/0216359 A1* | 9/2011 | Kamisuwa | ........... | G03G 15/553 358/1.15 |
| 2013/0335772 A1* | 12/2013 | Waller | ............... | H04N 1/00477 358/1.15 |
| 2014/0023382 A1* | 1/2014 | Kawana | ................. | G03G 15/55 399/8 |

FOREIGN PATENT DOCUMENTS

JP        2013012245 A        1/2013

* cited by examiner

*Primary Examiner* — Mark R Milia
(74) *Attorney, Agent, or Firm* — Canon U.S.A., Inc. IP Division

(57) ABSTRACT

The management apparatus receives first designation on a file and second designation of an image forming apparatus. The management apparatus obtains information from the image forming apparatus designated by the second designation in accordance with the first designation. The management apparatus outputs a file including the obtained information. Information of the image forming apparatus designated by the second designation includes network information of the image forming apparatus, a communication date and time, a connection state, apparatus information corresponding to the type received by the first designation, and page count information not designated by the type received by the first designation. When obtainment of information complying with the first designation fails, the output file includes both information representing an error of the connection state, and page count information previously obtained from the image forming apparatus.

11 Claims, 13 Drawing Sheets

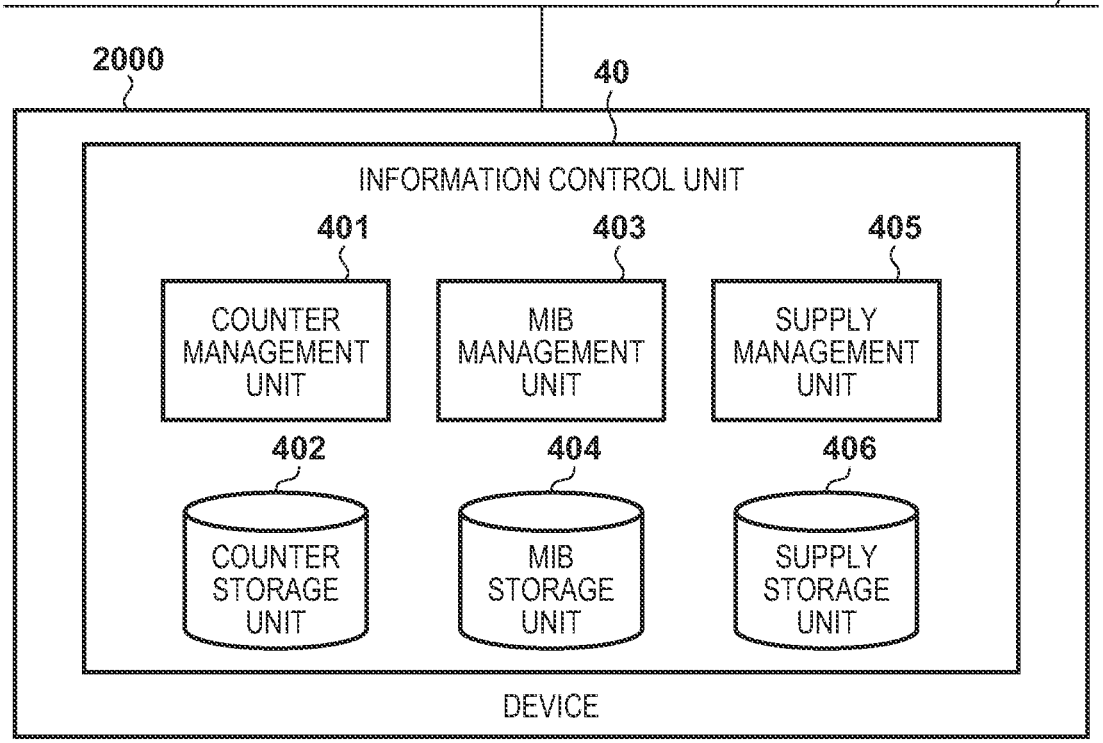

FIG. 6

| | DEVICE NAME | HOST NAME | REPORTING |
|---|---|---|---|
| ☐ | Device1 | host21 | DEVICE MONITORING |
| ■ | Device2 | host31 | |
| ☐ | Device3 | host44 | |

DEVICE    TASK

SELECT ALL    DEACTIVATE ALL

FIG. 7

REPORTING

TARGET         PROFILE    EDIT

Device2

■ REPORT 1
☐ REPORT 2
☐ REPORT 3

EXECUTE    CANCEL

FIG. 8

| DEVICE | TASK | | |
|---|---|---|---|

TASK

| TASK NAME | STATUS | SCHEDULE |
|---|---|---|
| REPORT 1 | OPERATING | EVERY DAY 17:00 |

LOG  ALL STATUS

| TASK NAME | STATUS | TARGET | DATE AND TIME |
|---|---|---|---|
| REPORT 1 | COMPLETE | 2 | 3/3 17:00 |

FIG. 9

CREATE PROFILE

| PROFILE NAME | REPORT 1 | |
|---|---|---|
| SCHEDULE | EVERY DAY 17:00 | SETTING |

SEND/SAVE REPORT

☐ E MAIL    ADDRESS [ ]

■ SAVE FILE    FOLDER    FILE NAME [FILE 1]

OK    CANCEL

F I G. 14

REPORT

| DEVICE NAME | UPDATE DATE AND TIME | OBTAINMENT FAILURE | NUMBER OF PRINT PAGES | ... |
|---|---|---|---|---|
| Device1 | MARCH 3rd 17:00 | | 1034 | ... |
| Device2 | MARCH 2nd 13:00 | * | 2055 | ... |

| TASK NAME | STATUS | SCHEDULE |
|---|---|---|
| REPORT 1 | OPERATING | EVERY DAY 17:00 |

LOG  ALL STATUS

| TASK NAME | STATUS | TARGET | OBTAINMENT FAILURE | DATE AND TIME |
|---|---|---|---|---|
| REPORT 1 | COMPLETE | 2 | 1 | 3/3 17:00 |

MANAGEMENT APPARATUS, METHOD, AND NON-TRANSITORY COMPUTER READABLE STORAGE MEDIUM

BACKGROUND

Field of the Disclosure

The present disclosure relates to a management apparatus, a method, and a non-transitory computer readable storage medium.

Description of the Related Art

For an image forming apparatus (device) such as a printer or a multi-function peripheral, a device management system or a management apparatus has been known to obtain and manage data such as operating information. The number of devices manageable by one management apparatus is increasing in terms of an increasing number of devices to be managed, cost reduction of a management server, and maintenance.

The device management system generally performs device management, setting, information collection, or the like by creating a template of operations to be executed in advance as a profile, and creating a task that designates a device based on the profile.

Some device management systems have a reporting function of obtaining and reporting the total number of print pages, a status, service life information of a supply, or the like from each device. Japanese Patent Laid-Open No. 2013-012245 has disclosed a technique for prompting the user to be more aware of the cost by adopting a counting means for counting information about the use of a device based on information collected from the device for each site to which the device belongs.

SUMMARY OF THE DISCLOSURE

According to one embodiment of the present disclosure, a management apparatus comprises, at least one memory storing instructions, and at least one processor executing the instructions causing the management apparatus to: receive first designation of one of a cycle or a schedule, a type of apparatus information that should be included in a file, and a file format; receive second designation of an image forming apparatus subjected to a reporting function from at least one image forming apparatus; obtain information from the image forming apparatus designated by the second designation in accordance with the first designation; and output a file including the obtained information, wherein the output file includes, as information of the image forming apparatus designated by the second designation, network information of the image forming apparatus, a communication date and time, a connection state, apparatus information corresponding to the type received by the first designation, and page count information not designated by the type received by the first designation, and wherein when obtainment of information complying with the first designation fails, the output file includes both information representing an error of the connection state, and page count information previously obtained from the image forming apparatus.

Further features of the present disclosure will become apparent from the following description of exemplary embodiments (with reference to the attached drawings).

BRIEF DESCRIPTION OF THE DRAWINGS

FIG. 4 is a block diagram showing an example of the functional arrangement of a device according to the first embodiment;

FIG. 5 is a view showing an example of a device selection screen according to the first embodiment;

FIG. 6 is a view showing an example of a task selection screen according to the first embodiment;

FIG. 7 is a view showing an example of a profile selection screen according to the first embodiment;

FIG. 8 is a view showing an example of a task execution result screen according to the first embodiment;

FIG. 9 is a view showing an example of a profile setting screen according to the first embodiment;

FIG. 14 is a view showing an example of an output report display screen according to the first embodiment;

FIG. 15 is a view showing an example of a task execution result screen according to the second embodiment.

DESCRIPTION OF THE EMBODIMENTS

Figure 1:
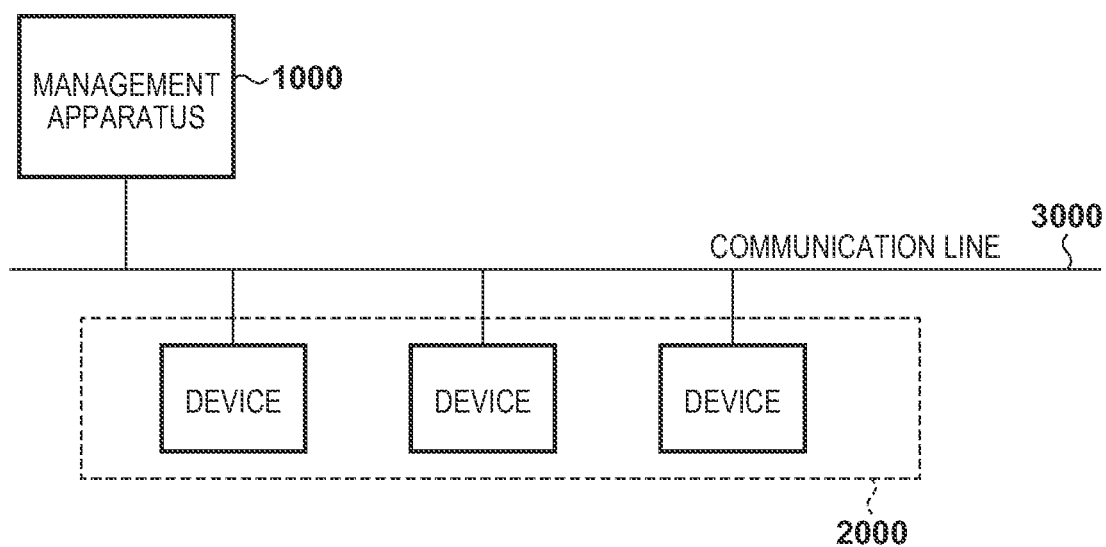
FIG. 1 is a block diagram showing an example of the configuration of a system including a management apparatus according to the first embodiment.

When obtaining data from a specific device fails at the time of the operation of a set task, each item such as the total number of print pages of the obtainment-failed device is not described by the above-described reporting function. As a result, a satisfactory report about the selected device cannot be obtained.

Further, the presence of the device from which obtainment of information has failed cannot be grasped from a task result screen in the device management system, and no proper management can be performed.

Note that the reason of the obtainment failure includes, for example, a failure in communication (owing to power-off of a printer, a network error, or the like) at the time of obtaining operating information of a counter or the like for a report.

According to an embodiment of the present disclosure, even when obtainment of data from a device fails at the time of executing the reporting function in the device management system, the user can easily grasp information of the device and easily grasp an error of the connection state.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

A management apparatus according to the first embodiment manages one or more image forming apparatuses (to be referred to as devices hereinafter). The management apparatus according to the embodiment obtains information from a device designated among one or more image forming apparatuses, and outputs a file including the obtained information. If the obtainment of the information from the device fails, the management apparatus according to the embodiment outputs information previously obtained from the device, together with information representing the failure in the obtainment of the information.

[System Configuration]

FIG. 1 is a block diagram showing an example of the configuration of a device management system including a management apparatus 1000 according to the embodiment. The management apparatus 1000 performs information processing, manages a device, and outputs a report about the device. In the example of FIG. 1, the management apparatus 1000 is a server that manages two or more devices 2000. Although the function of the device 2000 is not particularly limited, the device 2000 is an image forming apparatus that prints on a print medium from print data using a well-known printing technique such as an electrophotographic technique or an inkjet technique in the embodiment. The device 2000 may read a paper original via a scanner, copy it, or convert it into image data and send it to another apparatus by an electronic mail (email), In the embodiment, the management apparatus 1000 and the devices 2000 are connected to each other via a communication line 3000.

[Hardware Configuration]

Figure 2:
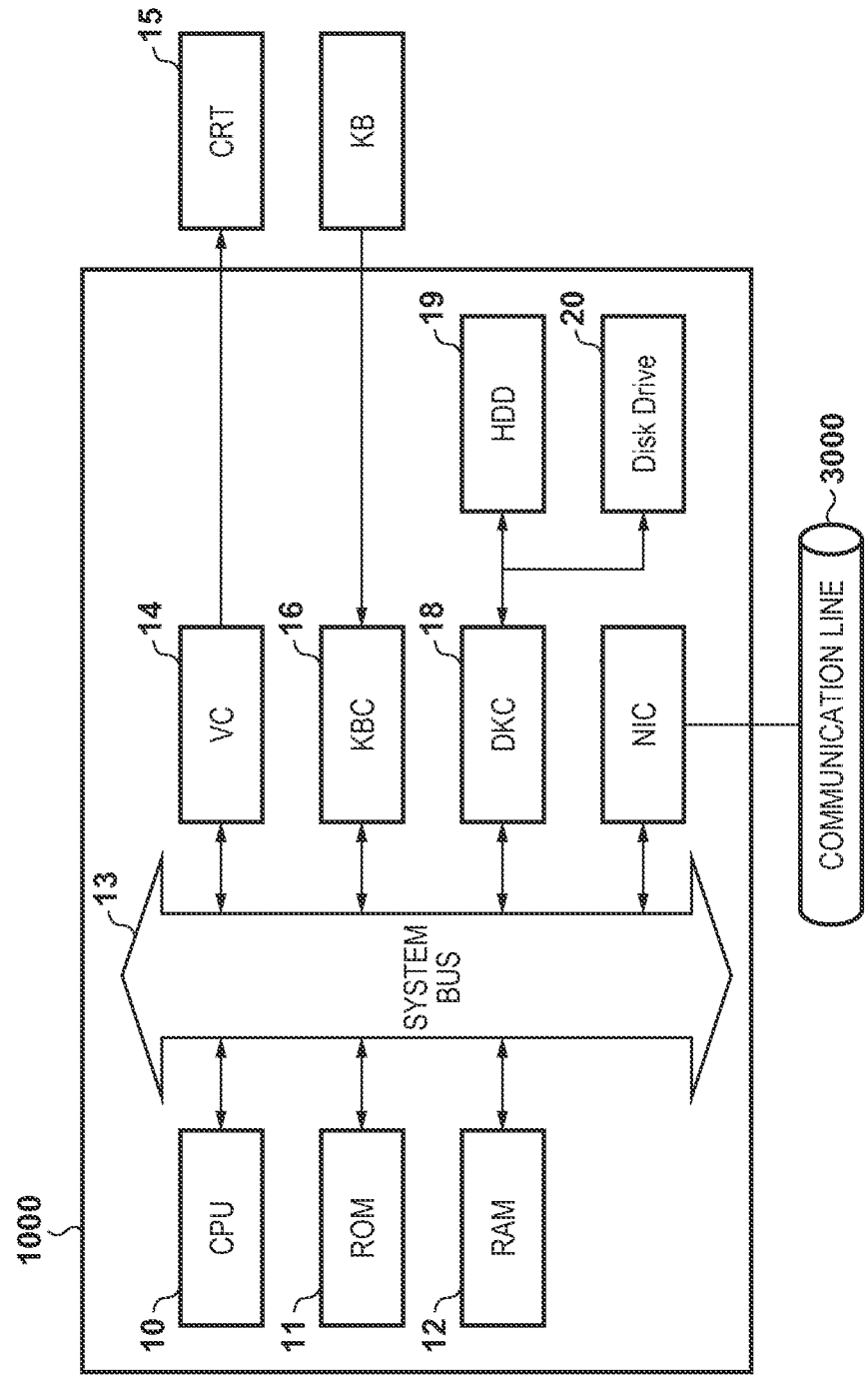
FIG. 2 is a block diagram showing an example of the hardware configuration of the management apparatus according to the first embodiment.

FIG. 2 is a block diagram showing an example of the hardware configuration of the management apparatus 1000 according to the embodiment The management apparatus 1000 includes a CPU 10, a ROM 11, and a RAM 12. The CPU 10 uses the RAM 12 as a work area and executes various programs such as an OS or device management software stored in the ROM 11 or an HDD 19. The management apparatus 1000 includes a disk controller (DKC) 18, a disk drive 20 capable of mounting a recording medium such as a CD-ROM, a HDD, a magnetic tape, or an IC memory card, a video card (VC) 14, and a display device (CRT) 15. The respective units of the management apparatus 1000 are connected via a system bus 13. The management apparatus 1000 communicates data with devices on the communication line 3000 via a network interface board (NIC).

[Software Configuration]

Figure 3:
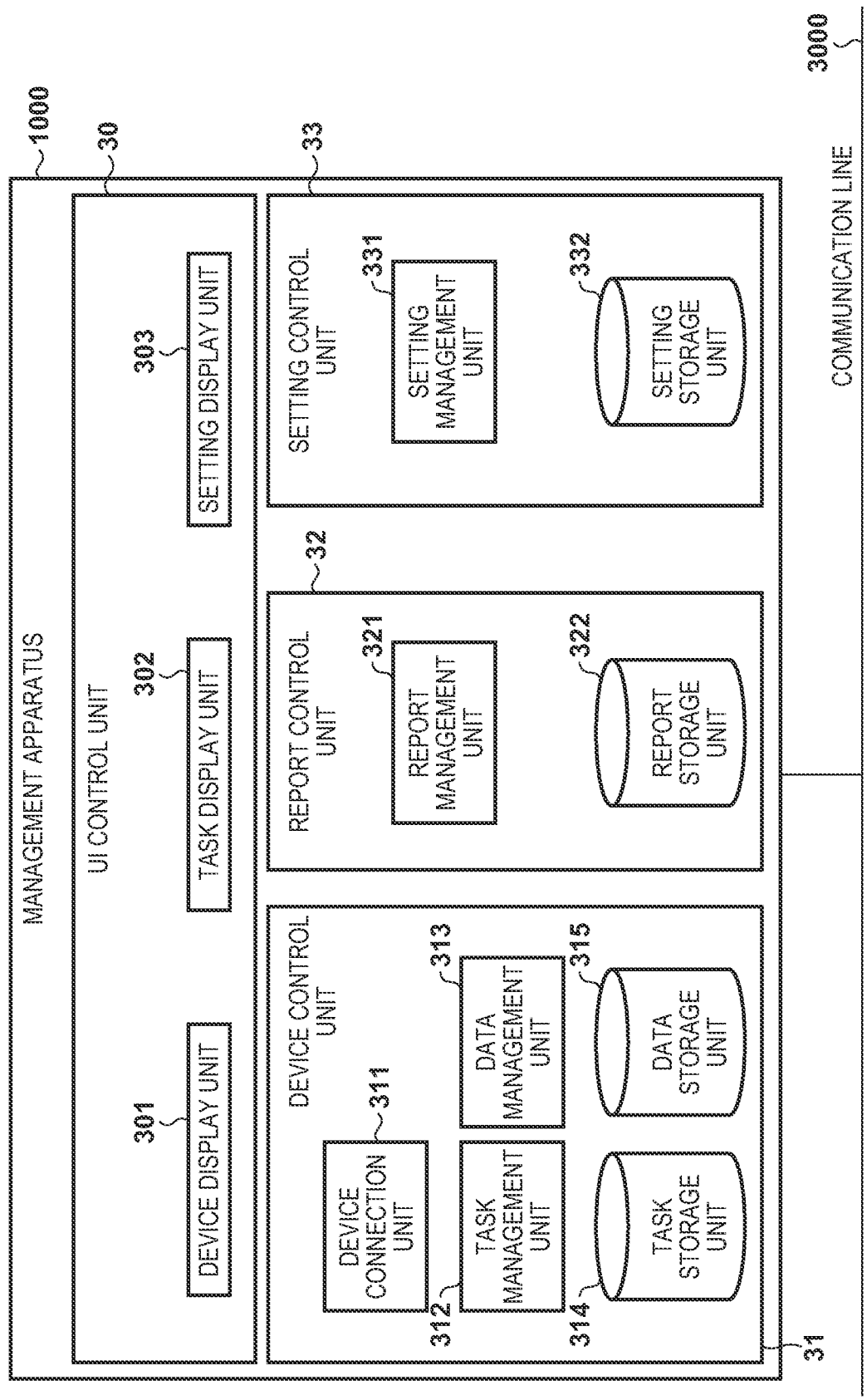
FIG. 3 is a block diagram showing an example of the functional arrangement of the management apparatus according to the first embodiment.

FIG. 3 is a block diagram showing an example of the functional arrangement of the management apparatus 1000 according to the embodiment. The management apparatus 1000 includes a user interface (UI) control unit 30, a device control unit 31, a report control unit 32, and a setting control unit 33. The functional arrangement shown in FIG. 3 is implemented by executing device management software by the CPU 10 in the RAM 12, the ROM 11, and the HDD 19 in FIG. 2. Note that processing by each functional unit of the management apparatus 1000 may be implemented by a web-based application, and the function may be used by the user via a web browser.

The UI control unit 30 controls a UI for performing each processing that is performed by the management apparatus 1000 according to the embodiment. In the embodiment, the UI control unit 30 includes a device display unit 301, a task display unit 302, and a setting display unit 303 that enable input/output of information in the device control unit 31, the report control unit 32, and the setting control unit 33, respectively.

The device control unit 31 includes a device connection unit 311, a task management unit 312, a data management unit 313, a task storage unit 314, and a data storage unit 315. The device connection unit 311 has a function of performing device search, obtaining information such as apparatus information from a device, and executing settings in a device. The device connection unit 311 checks a connection to a device (device 2000) serving as a reporting target (target to which a report is output), collects, from the reporting target, apparatus information for generating a report, and stores each collected information in the data storage unit 315. In the embodiment, page count information, MIB information, supply information, or the like is obtained as the apparatus information, details of which will be described later. In the embodiment, the apparatus information also includes identification information such as the device name of a device having undergone device search, a product name, and an IP address.

Reporting in the embodiment is processing of obtaining and outputting a report about page count information (total number of print pages) by a device, a status, service life information of a supply, or the like. Checking a connection to a device serving as a reporting target will be called device search. The device connection unit 311 can perform device search via a network by a well-known method such as SNMP, IP Broadcast, or SLP/Multicast, and the method is not particularly limited. The device connection unit 311 can perform device search at an arbitrary timing. The device connection unit 311 may collect or change apparatus information by referring to an apparatus information database such as Management Information Base (MIB) via the communication line 3000. The MIB is a management information database used by a protocol such as SNMP and is a well-known standard, so a description thereof will be omitted.

The task management unit 312 refers to a task stored in the task storage unit 314 or the data storage unit 315, issues an instruction to execute a task for outputting a report about a device having undergone search, and stores the execution result of the task in the task storage unit 314. In the embodiment, the task is processing that is set based on a profile (to be described later) and performed when outputting a report about a processing target device. The task execution instruction is transmitted to the device connection unit 311 or a report management unit 321.

The data management unit 313 checks whether there is apparatus information obtained in the past by previously executed device search, status update, or the like for a device having undergone device search. In the embodiment, the data management unit 313 can check whether apparatus information obtained in the past is stored in the data storage unit 315 for a device (causing a connection error) whose connection has not been confirmed by device search. The report management unit 321 generates a report based on the apparatus information obtained from the data management unit 313, and stores it in a report storage unit 322.

The task storage unit 314 and the data storage unit 315 are recording media such as databases operating on the HDD 19. In the embodiment, the task storage unit 314 stores a list of tasks, and the data storage unit 315 stores a list of devices. However, storage targets are not particularly limited to them, and arbitrary table data may be stored in either storage unit.

The setting display unit 303 obtains a user input for the settings of a profile, which is used for the settings of a task. Based on the user input to the setting display unit 303, a setting management unit 331 generates a profile used when outputting a report, and stores it in a setting storage unit 332. The profile will be described later with reference to FIGS. 7 and 9.

[Software Configuration of Device]

FIG. 4 is a block diagram showing an example of the functional arrangement of the device 2000 according to the embodiment. When a connection to the management apparatus 1000 is confirmed by device search, the device 2000 generates apparatus information used to generate a report, and transmits it to the management apparatus 1000 via the communication line 3000.

The device 2000 includes an information control unit 40. In the embodiment, the information control unit 40 includes a counter management unit 401, a counter storage unit 402, an MIB management unit 403, an MIB storage unit 404, a supply management unit 405, and a supply storage unit 406 in order to generate and manage apparatus information. The counter management unit 401 records page count information serving as information of the number of print pages by the device 2000, and stores it in the counter storage unit 402. The MIB management unit 403 records MIB information and stores it in the MIB storage unit 404. The supply management unit 405 records information representing the state of a supply used for device output, such as the remaining amount of toner in the device 2000 or the supply change count, and stores it in the supply storage unit 406. Note that pieces of information recorded by the functional units of the information control unit 40 are not particularly limited to them, and information the user wants to record in a report may be recorded. For example, the information control unit 40 may record information such as the number of paper jams in the device 2000 or an error history. In the embodiment, the network information, communication date and time, connection state, and apparatus information of a device are described in a report in the following description.

Task creation processing to be performed by the management apparatus 1000 according to the embodiment will be described with reference to FIGS. 5 to 9. FIGS. 5 to 9 are views each showing an example of a UI displayed by the management apparatus 1000 according to the embodiment.

The management apparatus 1000 performs device search on the network and checks a connection to a device serving as a reporting target. FIG. 5 shows an example of a UI screen displayed after device search. In FIG. 5, the device display unit 301 displays detected devices and apparatus information of the devices. When creating a task, the user selects a device subjected to task creation from the detected devices. The device display unit 301 displays reporting as a sellable task for the selected device. The settable task is not limited to reporting. For example, desirable tasks such as device monitoring may be displayed in accordance with the type and function of a device, and the user may select a task from them. FIG. 6 shows an example of settable tasks displayed for the device subjected to task creation.

In the embodiment, reporting is selected as a task. After selecting the task, the device display unit 301 displays a list of profiles each serving as a template setting corresponding to the task. The profile according to the embodiment includes a schedule representing a cycle in which a report is output, the type of apparatus information that should be included in the report, and information designating the file name of the report to be output. The profile may also include information about output of the report, such as selection of processing of whether to write the report in a file or send it as an email. FIG. 7 shows an example of a UI screen that displays a list of profiles. In the following description, a profile is created in advance and stored in the setting storage unit 332, but is not particularly limited to this. For example, the user may edit settings by clicking an edit button or the like when selecting a profile, or a profile may be newly created.

FIG. 9 shows an example of a UI screen for creating a profile. The setting display unit 303 displays a UI screen for setting a profile. The setting display unit 303 may obtain information that is input to the user by the UI screen, such as a profile name (task name) and the schedule of a report. In FIG. 9, the schedule is set to perform reporting at 17:00 every day as settings of a profile name "report 1", and a setting to write a report as a file name "file 1" in a file is input. When sending a report to be output as an email, the user may set its destination. The setting cycle of the schedule is not particularly limited and may be selected from, for example, every month, every week, and every day. Further, the output schedule of a report is not limited to the cyclic setting, and a report may be output in a schedule the user wants, such that a report is output in accordance with a user operation.

When the user selects a profile and clicks an execution button as shown in FIG. 7, a selected profile is set as a task. The task display unit 302 displays the set task. The task display unit 302 may display the execution result of the set task. FIG. 8 shows an example of a UT screen that displays the set task. In FIG. 8, the task to perform reporting at 17:00 every day based on the profile "report 1" created in the example of FIG. 9 is set. In FIG. 8, the execution result of the set task is displayed as a log.

Note that apparatus information to be reported is designated by a profile, as described above. In the embodiment, however, the profile does not designate output of page count information, and page count information is output in the report. In this manner, the device connection unit 311 can add, to the contents of the report, apparatus information not designated by the profile.

The task display unit 302 may display the execution result of a task having a specific status among the execution results of set tasks. To do this, the task display unit 302 can obtain the progress of a set task and display the progress as the status of the execution result of the task. The status of the execution result of the task may be, for example, "complete" representing the completion of execution of a task, or "error" representing a failure in execution of a task. The user may designate "complete" or "error" as the status of the execution result of a task that is displayed on the task display unit 302, or may designate "all statuses" to display both of them. In the example of FIG. 8, the status of report 1 is "complete", "all statuses" is designated as the status of an execution result to be displayed, so the output result of report 1 is displayed. Information designating the status of the execution result of a task will be called a task log display condition.

According to a series of settings as shown in FIGS. 5 to 9, a report about a device can be output based on a task created for a selected device.

As described above, the management apparatus 1000 according to the embodiment determines whether it can connect to a device, and when it cannot connect to the device, outputs a report based on apparatus information at the past time when it could connect to the device, together with information representing the connection state. When executing a task, the device connection unit 311 determines whether apparatus information can be obtained from the device 2000. In the embodiment, when the management apparatus 1000 cannot connect to a device, for example, when the power supply of the device 2000 is off, the device connection unit 311 determines that no apparatus information can be obtained. When a report can be generated, the device connection unit 311, as normal, issues an instruction to execute a task. To the contrary, when no report can be generated, the device connection unit 311 obtains again from the data storage unit 315 apparatus information that has been obtained at the past time from the unconnectable device, and generates a report based on the reobtained apparatus information.

Processing to be performed by the management apparatus 1000 will be described with reference to FIG. 10. Note that each process shown in FIG. 10 is implemented by loading a control program from the HDD 19, the ROM 11, or the like into the RAM 12 and executing it by the CPU 10.

Figure 10:
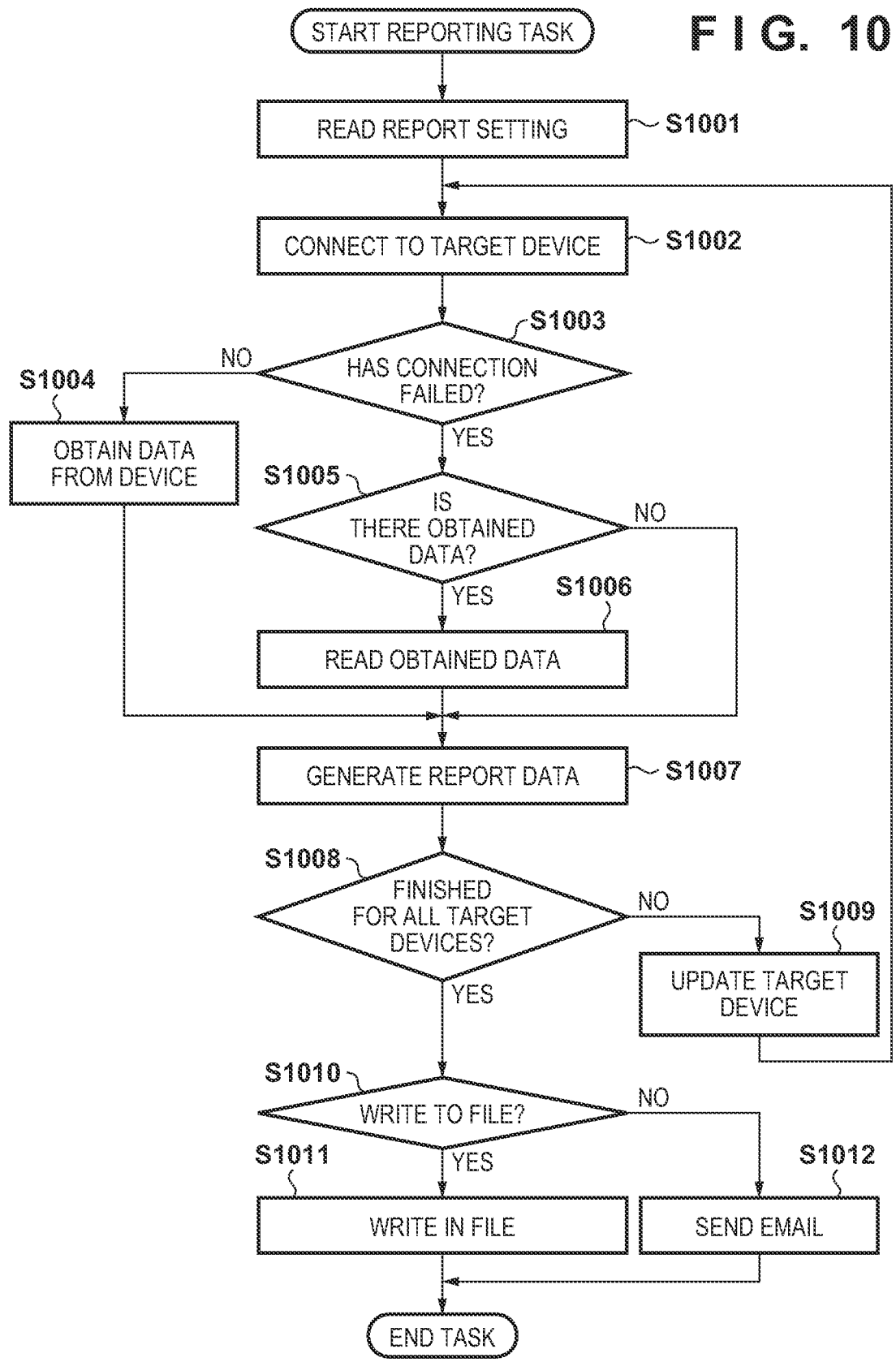
FIG. 10 is a flowchart showing an example of processing of a management method according to the first embodiment.

FIG. 10 is a flowchart showing an example of processing to be performed by the management apparatus according to the embodiment. Processes in steps S1001 to S1012 are processes to be performed on a device selected as a task target based on a task set by a series of settings as shown in FIGS. 5 to 9 described above. These processes are executed according to the schedule of a profile selected at the time of setting a task. In step S1001, the report management unit 321 reads a profile set in advance from the setting storage unit 332. The report management unit 321 reads a set task, and obtains target devices selected as task targets and the setting contents of the profile. In step S1002, the device connection unit 311 performs device search for a device selected from the target devices, and connects to the device. In step S1003, the device connection unit 311 determines whether the connection in step S1002 has failed. If the connection has failed, the process advances to step S1005; if the connection is successful, to step S1004.

In step S1004, the device connection unit 311 obtains, from the device connected in step S1002, apparatus information used to generate a report, such as page count information, MIB information, or supply information. After step S1004, the process advances to step S1007.

In step S1005, the data management unit 313 determines whether there is apparatus information obtained in the past by previous device search, status update, or the like for the device failed in connection in step S1002. If there is apparatus information obtained in the past, the process advances to step S1006; if there is no apparatus information obtained in the past, to step S1007.

In step S1006, the report management unit 321 obtains the apparatus information obtained in the past for the device failed in connection in step S1002, In the embodiment, the report management unit 321 obtains the apparatus information obtained in the past from the data storage unit 315 via the data management unit 313. After step S1006, the process advances to step S1007.

In step S1007, the report management unit 321 generates a report. If the connection is successful in step S1002, the report management unit 321 generates a report based on the apparatus information obtained in step S1004. If the apparatus information obtained in the past has been confirmed in step S1005, the report management unit 321 generates a report based on the past apparatus information obtained in step S1006. If a report output in the past has not been confirmed in step S1005, the report management unit 321 determines that the execution of the task has failed, and sets "error" as the status of the execution result of the task. Note that the report management unit 321 may generate a report including the result of determination in step S1003 as information.

In step S1008, the report management unit 321 determines whether all the target devices have been selected in step S1002. If all the target devices have been selected, the process advances to step S1010. If not all the target devices have been selected, target device update processing is performed in step S1009 and the process returns to step S1002.

In step S1010, the report management unit 321 determines, based on the setting contents of the profile obtained in step S1001, whether to write the report created in step S1007 in a file or send it by an email. The process shifts to step S1011 for the report to be written in a file, and to step S1012 for the report to be sent by an email.

In step S1011, the report management unit 321 writes the report in the file with a file name based on the setting contents of the profile obtained in step S1001, and then the process ends. In step S1012, the report management unit 321 sends the report as an email to a destination based on the setting contents of the profile obtained in step S1001, and then the process ends.

FIG. 14 is a view showing an example of a file output when there is an unconnectable device, by processing of the management apparatus 1000. Assume that Device1 and Device2 are selected as devices via the UI shown in FIG. 5 at the time of creating a task. In the following description, report 1 is selected as a profile for the two devices, and in report 1, reporting is performed at 17:00 every day and the report is written as a file name "file 1" in the file.

The settings of a task are read in step S1001, and a connection to Device1 is performed first in step S1002. The connection to Device1 is performed normally, and the device connection unit 311 obtains apparatus information including the print page count: 1034 from page count information of Device1 in step S1004. In step S1007, the report management unit 321 generates a report about Device1. Since no processing for Device2 has been performed yet, the process returns to step S1002.

In this case, the power supply of Device2 is off, so a connection to Device2 fails in device search in step S1002. Since Device2 was connected on the previous day and apparatus information has been obtained by status check, the data management unit 313 obtains the apparatus information obtained on the previous day for Device2 in step S1005. At this time, the data management unit 313 obtains apparatus information including the print page count: 2055 for Device2. In step S1007, the report management unit 321 generates a report about Device2, and file 1 is generated based on these reports in step S1011. In FIG. 14, as for Device1, information can be obtained on the current day and the print page count obtained at that time is described as 1401 together with the update date and time. As for Device2, no information can be obtained on the current day, and the print page count obtained on the previous day and a record of the failure in connection are described as 1402 together with the update date and time of the print page count. Note that the start date and time of the task may be displayed as the update date and time of the print page count (apparatus information), a communication date and time when apparatus information was obtained may be displayed, or a date and time when the report was generated and displayed may be displayed.

By this processing, in output of a report, a report based on data obtained as the result of a connection can be output for a connectable device, and a report based on data obtained in the past can be output for an unconnectable device.

In the embodiment, a profile name and the schedule of a report are exemplified as the contents of the settings of a profile. However, the settings of a profile are not limited to them, and a setting item the user wants may be set. For example, the setting display unit 303 may set an item for designating a file format (for example, CSV format or XML format) when writing a report in a file, and obtain a user input. In step S1011, a file reflecting the input contents is output.

Second Embodiment

A management apparatus according to the second embodiment is a device management apparatus that outputs a report about a device. The management apparatus according to the embodiment displays, together with a log, the presence/absence of a device for which obtainment of information has failed, in order to easily grasp a state of connection to a device subjected to the reporting function. For example, when there is a device for which obtainment of apparatus information has failed (that is, a connection has failed), the management apparatus according to the embodiment can display the number of such devices.

In the following description, the management apparatus according to the embodiment displays, together with a log, the number of devices for which obtainment of apparatus information has failed. A device management system including the management apparatus according to the second embodiment has basically similar arrangements as those in FIGS. 1 to 3 according to the first embodiment and performs similar processing except that the number of devices for which obtainment of apparatus information has failed is displayed, and a repetitive description will be omitted.

In the second embodiment, a task display unit 302 obtains, from a task storage unit 314, information (task log information) of a task that is set as a task and has already operated. The task log information includes information about the number of devices subjected to device search in the task, and the number of devices for which obtainment of apparatus information has failed in the device search. The task log information also includes information representing whether generation of a report by the task has completed or failed (error).

Based on the obtained task log information, the task display unit 302 displays, together with the execution result of the task, the number of devices for which obtainment of apparatus information has failed. FIG. 15 shows an example of a UI screen in which the execution result of a task is displayed for a registered task together with the number of devices for which obtainment of apparatus information has failed. In the example of FIG. 15, the task display unit 302 displays "1" as the number of devices for which obtainment of apparatus information has failed, in addition to the execution result of report 1 shown in FIG. 8.

Processing performed by the management apparatus according to the embodiment to display the number of devices for which obtainment of apparatus information has failed will be described with reference to FIG. 11. Note that each process shown in FIG. 11 is implemented by loading a control program from an HDD 19, a ROM 11, or the like into a RAM 12 and executing it by the CPU 10.

Figure 11:
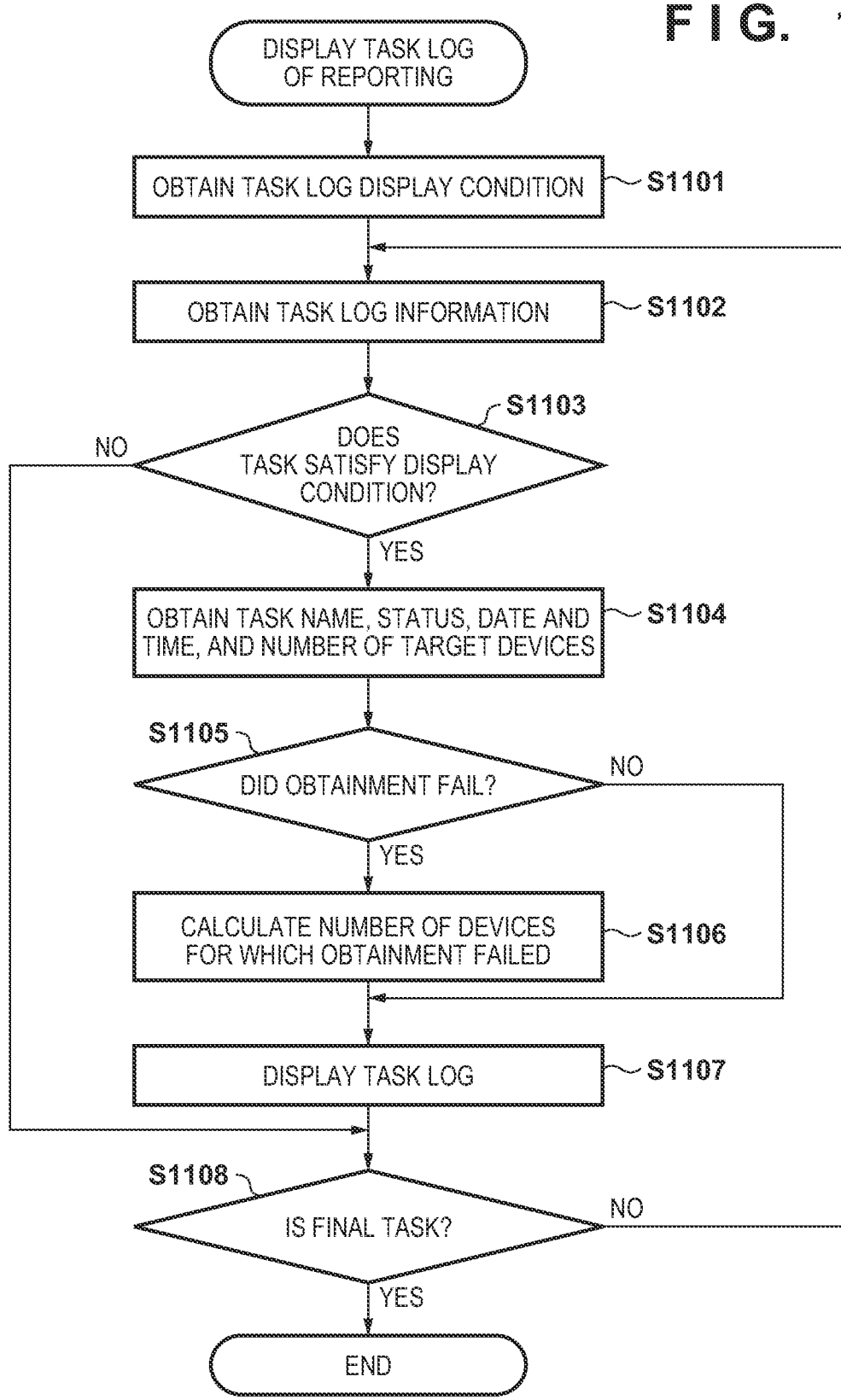
FIG. 11 is a flowchart showing an example of processing of a management method according to the second embodiment.

FIG. 11 is a flowchart showing an example of task execution result display processing to be performed by the task display unit 302 according to the embodiment. In step S1101, the task display unit 302 obtains a set task log display condition. In the example of FIG. 15, the user designates "all statuses" as the task log display condition. In step S1102, the task display unit 302 obtains task log information from a task storage unit 314.

In step S1103, the task display unit 302 determines whether the execution result of the task whose task log information has been obtained satisfies the task log display condition obtained in step S1101. If the execution result of the task satisfies the task log display condition, the process advances to step S1104, If the execution result of the task does not satisfy the task log display condition, it is not displayed and the process advances to step S1108.

In step S1104, the task display unit 302 obtains information about a task name to be displayed, a status representing the progress of the task, the start date and time of the task, and the number of target devices. In step S1105, the task display unit 302 determines whether a device for which obtainment of apparatus information has failed exists among the target devices. If a device for which Obtainment of apparatus information has failed exists, the process advances to step S1106. If no such device exists, the process advances to step S1107.

In step S1106, based on the task log information obtained in step S1102, the task display unit 302 calculates the number of devices for which obtainment of apparatus information has failed among the target devices, and then the process advances to step S1107. If the information of the number of devices for which obtainment of apparatus information has failed has been obtained in step S1106, the task display unit 302 displays the execution result of the task together with this information in step S1107.

In step S1108, the task display unit 302 determines whether the processes in steps S1102 to S1107 have been performed on all registered tasks. If the processes have been performed on all tasks, the process ends. If the processes have not been performed on all tasks, the processing target task is updated and the process returns to step S1102.

By this processing, the number of devices for which output of a report has failed can be displayed. The user can easily grasp the device connection state of the reporting function.

Third Embodiment

A management apparatus according to the third embodiment is a device management apparatus that outputs a report about a device. The management apparatus according to the embodiment changeably sets the file name of a report to be output. A device management system including the management apparatus according to the third embodiment has basically similar arrangements as those in FIGS. 1 to 3 according to the first embodiment and performs similar processing except that a report with a changeable file name is output, and a repetitive description will be omitted.

In the third embodiment, a setting display unit 303 changeably sets the file name of a report to be output when setting a profile. The changeable file name can be set to change in accordance with, for example, the output timing of a report. In the embodiment, the changeable file name is decided to indicate a generation time such as the year, month, day, minute, and second when a report was generated (for example, "20200303170000"), but is not particularly limited to this. For example, the setting display unit 303 may set a file name so as to output a report with a file name designated by a combination of a fixed prefix and a changeable name, or may generate a file name of a fixed number of digits based on a random number.

Figure 16:
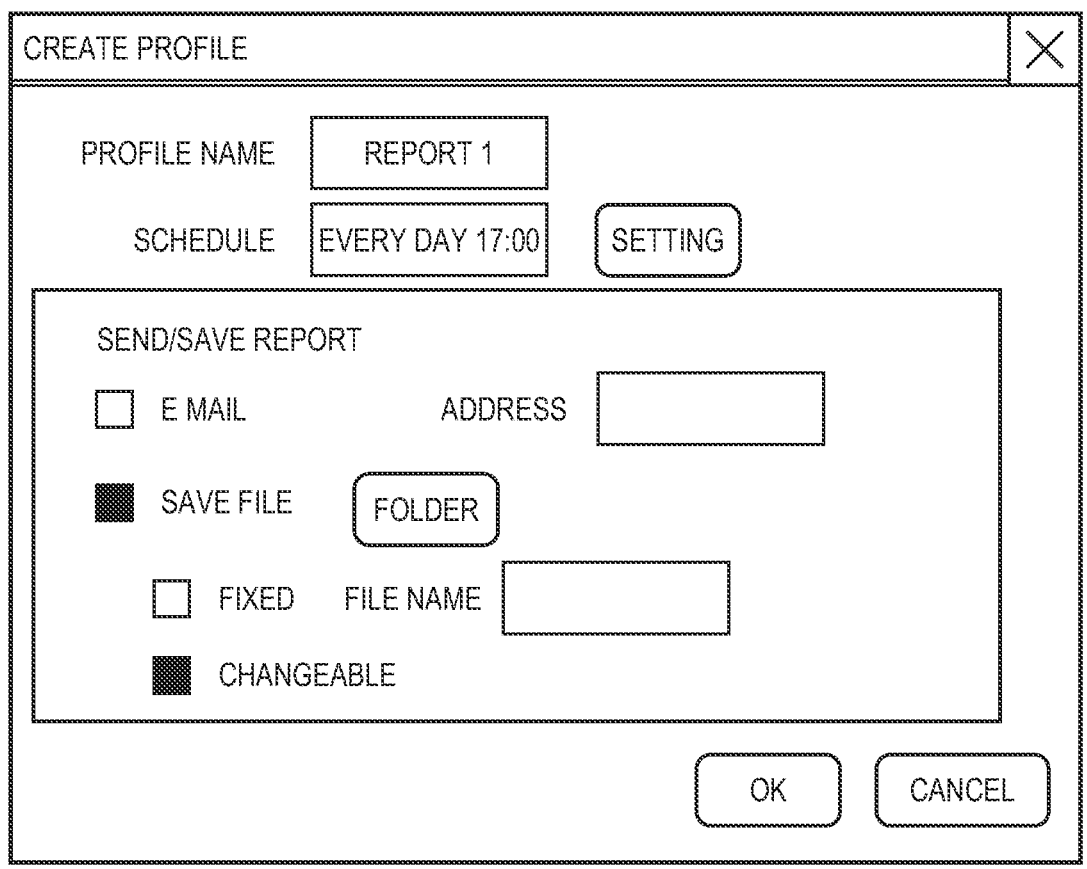
FIG. 16 is a view showing an example of a profile setting screen according to the third embodiment.

FIG. 16 shows an example of a UI screen for setting a profile having a changeable file name. In the example shown in FIG. 16, the setting display unit 303 sets a frame to which a user selection of whether to fix a file name when writing a report in a file is input, in addition to the profile setting screen shown in FIG. 9 in the first embodiment. When a user selection to change a file name is obtained, the setting display unit 303 allows setting a profile with a changeable file name.

Processing performed by the management apparatus according to the embodiment to output a report with a changeable file name will be described with reference to FIGS. 12 and 13. Note that each process shown in FIGS. 12 and 13 is implemented by loading a control program from an HDD 19, a ROM 11, or the like into a RAM 12 and executing it by the CPU 10.

Figure 12:
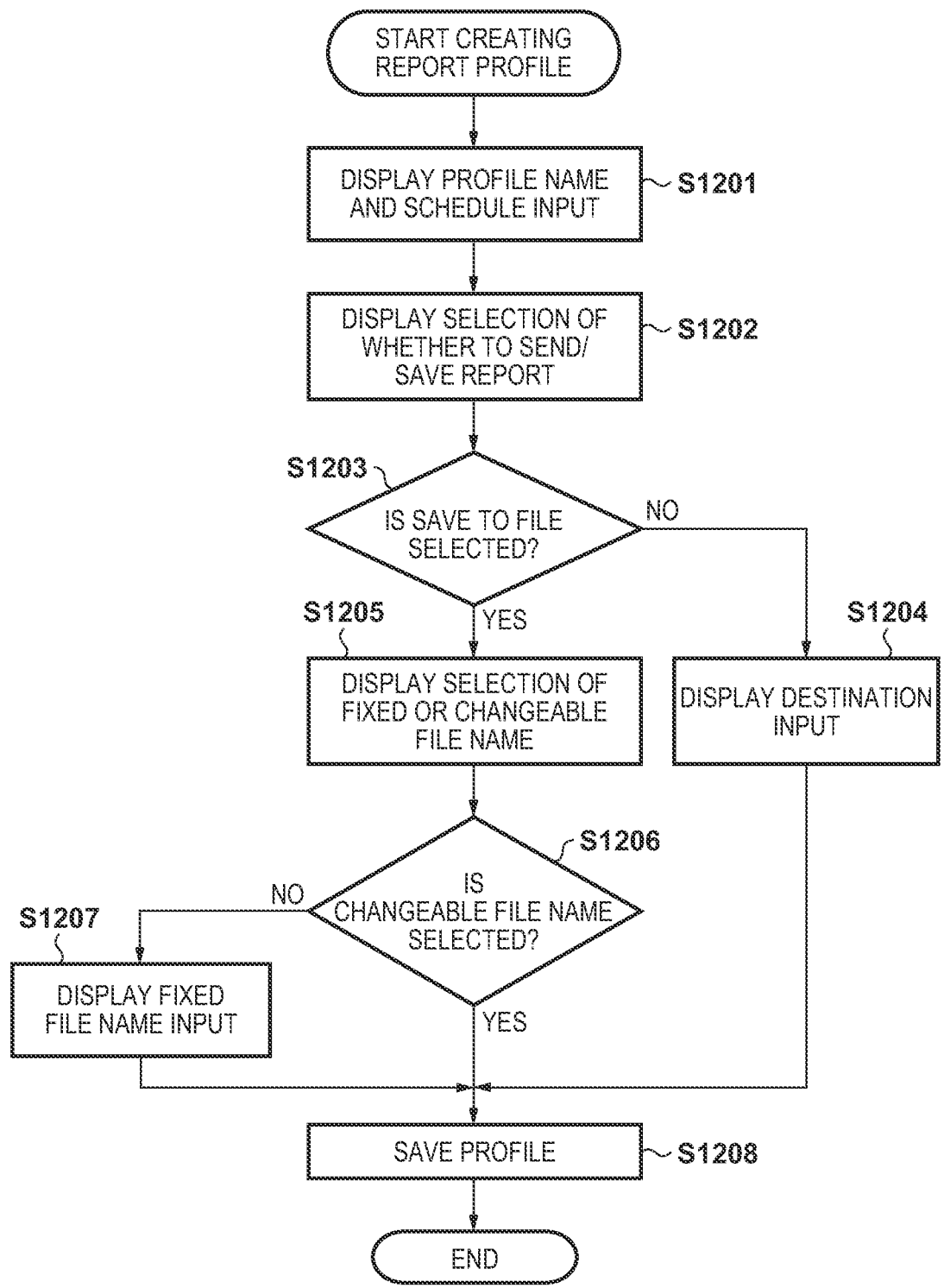
FIG. 12 is a flowchart showing an example of processing of a management method according to the third embodiment.
Figure 13:
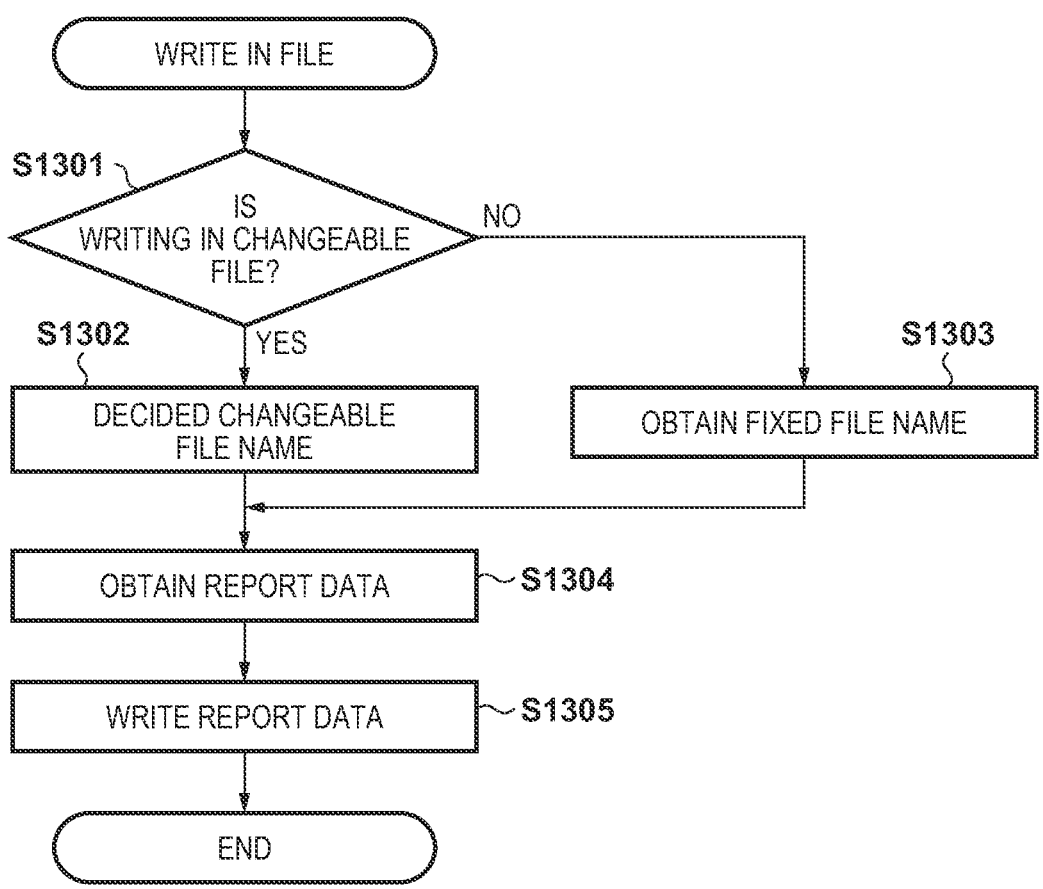
FIG. 13 is a flowchart showing an example of file name decision processing according to the third embodiment.

FIG. 12 is a flowchart showing an example of processing performed by the setting display unit 303 according to the embodiment to obtain a user input regarding the settings of a profile. In step S1201, the setting display unit 303 obtains and displays information about a profile name and a schedule. In step S1202, the setting display unit 303 obtains a user selection of whether to write a report in a file or send it as an email. In step S1203, the setting display unit 303 determines whether it has been selected in step S1202 to write a report in a file. If it has been selected to write a report in a file, the process advances to step S1205; if it has not been selected to write a report in a file, to step S1204. In step S1204, the setting display unit 303 obtains and displays the email destination and the process advances to step S1208.

In step S1205, the setting display unit 303 obtains a user selection of the fixed or changeable file name as the file name of the report to be written. In step S1206, the setting display unit 303 determines whether the user selection obtained in step S1205 is a changeable file name. If the user selection is a changeable file name, the process advances to step S1208; if the user selection is a fixed file name, to step S1207, in step S1207, the setting display unit 303 obtains and displays a fixed file name and the process advances to step S1208.

In step S1208, the setting display unit 303 saves the settings of the profile based on obtained pieces of information, and stores them in a setting storage unit 332 via a setting management unit 331.

The management apparatus according to the embodiment performs report output processing as shown in FIG. 10 similarly to the first embodiment by using the thus-set profile. FIG. 13 is a flowchart showing an example of processing performed by a report management unit 321 according to the embodiment in write with a file name in step S1011.

In step S1301, the report management unit 321 determines whether a file name to be written in step S1011 is changeable. If the file name is changeable, the process advances to step S1302; if the file name is fixed, to step S1303.

In step S1302, the report management unit 321 decides a changeable file name. In the embodiment, the changeable file name is decided in accordance with the year, month, day, minute, and second when a report was generated, as described above. In step S1303, the report management unit 321 obtains a fixed file name set in the profile. After step S1302 or step S1303, the process advances to step S1304.

In step S1304, the report management unit 321 obtains data of the report generated in step S1007. In step S1305, the report management unit 321 writes in the file the report obtained in step S1304 with the file name decided in step S1302 or step S1303. Then, the process ends.

By this processing, a report about a device can be output with a changeable file name. Even when a report is output periodically, a file name can be easily managed and stored, improving the operability.

Note, the embodiments are not intended to limit the scope of the present disclosure. Multiple features are described in the embodiments, but limitation is not lade to a disclosure that requires all such features, and multiple such features may be combined as appropriate. Furthermore, in the attached drawings, the same reference numerals are given to the same or similar configurations, and redundant description thereof is omitted.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by; for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-094913, filed May 29, 2020 which is hereby incorporated by reference herein in its entirety.

What is claimed is:
1. A management apparatus comprising,
at least one memory storing instructions, and
at least one processor executing the instructions causing the management apparatus to:
receive a first designation of one of a cycle or a schedule at which a file is output, a type of apparatus information that should be included in the file, and a format of the file, wherein the file includes information regarding an image forming apparatus;

receive a second designation of an image forming apparatus subjected to obtain the information regarding the image forming apparatus from at least one image forming apparatus; and perform reporting processes iteratively at the cycle or the schedule designated in the first designation, each reporting process including:

communicating with the image forming apparatus designated by the second designation to obtain the information regarding the designated image forming apparatus;

generating and outputting the file including the information regarding the designated image forming apparatus; and storing page count information, included in the information obtained from the designated image forming apparatus, indicating a number of pages printed by the designated image forming apparatus;

wherein the file includes, as the information regarding the designated image forming apparatus, network information of the designated image forming apparatus, a communication date and time with the designated image forming apparatus, a connection state with the designated image forming apparatus, the apparatus information corresponding to the type designated by the first designation, and the page count information, wherein when obtainment of the information regarding the designated image forming apparatus fails, a number of the designated image forming apparatus from which the obtainment of the information has failed is counted, and in the output of the file, the file including the number of the designated image forming apparatuses, information representing an error of the connection state with the designated image forming apparatus from which the obtainment of the information fails, and page count information previously obtained from the designated image forming apparatus from which the obtainment of the information fails is output, and wherein the file output in a respective reporting process does not include the count information obtained in a previous reporting process but includes the count information obtained in a current reporting process from a first image forming apparatus from which the information regarding the designated image forming apparatus is obtained in the current reporting process, and wherein the file output in the respective reporting process includes the count information obtained in a previous reporting process from a second image forming apparatus from which the information regarding the designated image forming apparatus is not obtained in the current reporting process.

2. The management apparatus according to claim 1, wherein the instructions further cause the management apparatus to display an output result of the file and display, as the output result, information of the number of image forming apparatuses for which obtainment of the information regarding the designated image forming apparatus has failed.

3. The management apparatus according to claim 2, wherein the instructions further cause the management apparatus to display, as the output result, the number of the designated image forming apparatuses.

4. The management apparatus according to claim 1, wherein the format of the file is selectable from CSV and XML.

5. The management apparatus according to claim 1, wherein the schedule is selected and set from every month, every week, and every day.

6. The management apparatus according to claim 1, wherein a file name of the file for the designated image forming apparatus changes at every timing.

7. The management apparatus according to claim 6, wherein the file name represents a generation time of the file.

8. The management apparatus according to claim 1, wherein the second designation includes designation of at least two image forming apparatuses, and
the file includes:
the obtained page count information for an image forming apparatus for which obtainment of the information regarding the designated image forming apparatus at a first timing is successful; and
for an image forming apparatus for which obtainment of the information regarding the designated image forming apparatus at the first timing has failed, the page count information obtained at a second timing before the first timing according to one of the cycle or the schedule, and information representing that the obtainment of the information has failed.

9. The management apparatus according to claim 1, wherein the instructions further cause the management apparatus to provide a user with a user interface to receive the first designation, wherein the user interface does not receive designation of whether the file to be output includes the count information.

10. A method for a management apparatus comprising:
receiving a first designation of one of a cycle or a schedule at which a file is output, a type of apparatus information that should be included in the file, and a format of the file, wherein the file includes information regarding an image forming apparatus;

receiving a second designation of an image forming apparatus subjected to obtain the information regarding the image forming apparatus from at least one image forming apparatus; and performing reporting processes iteratively at the cycle or the schedule designated in the first designation, each reporting process including:
communicating with the image forming apparatus designated by the second designation to obtain information regarding the designated image forming apparatus;
generating and outputting the file including the information regarding the designated image forming apparatus; and
storing page count information, included in the information obtained from the designated image forming apparatus, indicating a number of pages printed by the designated image forming apparatus;

wherein the file includes, as the information regarding the designated image forming apparatus, network information of the designated image forming apparatus, a communication date and time with the designated image forming apparatus, a connection state with the designated image forming apparatus, the apparatus information corresponding to the type designated by the first designation, and the page count information, wherein when obtainment of the information regarding the designated image forming apparatus fails, a number of the designated image forming apparatus from which the obtainment of the information has failed is counted, and in the outputting the file, the file includes the number of the designated image forming apparatuses, information representing an error of the connection state with the designated image forming apparatus from which the obtainment of the information fails, and page count information previously obtained from the designated image forming apparatus from which the obtainment of the information fails is output, wherein the file output in a respective reporting process does not include the count information obtained in a previous reporting process but includes the count information obtained in a current reporting process from a first image forming apparatus from which the information regarding the designated image forming apparatus is obtained in the current reporting process, and wherein the file output in a respective reporting process includes the count information obtained in a previous reporting process from a second image forming apparatus from which the information regarding the designated image forming apparatus is not obtained in the current reporting process.

11. A non-transitory computer readable storage medium on which is stored a computer program for making a computer execute a method for a management apparatus, the method comprising:

receiving a first designation of one of a cycle or a schedule at which a file is output, a type of apparatus information that should be included in the file, and a format of the file, wherein the file includes information regarding an image forming apparatus;

receiving a second designation of an image forming apparatus subjected to obtain the information regarding the image forming apparatus from at least one image forming apparatus; and performing reporting processes iteratively at the cycle or the schedule designated in the first designation, each reporting process including:

communicating with the image forming apparatus designated by the second designation to obtain information regarding the designated image forming apparatus;

generating and outputting the file including the information regarding the designated image forming apparatus; and storing page count information, included in the information obtained from the designated image forming apparatus, indicating a number of pages printed by the designated image forming apparatus, wherein the file includes, as the information regarding the designated image forming apparatus, network information of the designated image forming apparatus, a communication date and time with the designated image forming apparatus, a connection state with the designated image forming apparatus, the apparatus information corresponding to the type designated by the first designation, and the page count information, wherein when obtainment of the information regarding the designated image forming apparatus fails, a number of the designated image forming apparatus from which the obtainment of the information has failed is counted, and in the outputting the file, the file includes the number of the designated image forming apparatuses, information representing an error of the connection state with the designated image forming apparatus from which the obtainment of the information fails, and page count information previously obtained from the designated image forming apparatus from which the obtainment of the information fails is output, wherein the file output in a respective reporting process does not include the count information obtained in a previous reporting process but includes the count information obtained in a current reporting process from a first image forming apparatus from which the information regarding the designated image forming apparatus is obtained in the current reporting process, and wherein the file output in a respective reporting process includes the count information obtained in a previous reporting process from a second image forming apparatus from which the information regarding the designated image forming apparatus is not obtained in the current reporting process.

* * * * *